US011449395B2

(12) United States Patent
Narayanan et al.

(10) Patent No.: US 11,449,395 B2
(45) Date of Patent: Sep. 20, 2022

(54) BACKUP AND RESTORE OF DISTRIBUTED ENVIRONMENTS

(71) Applicant: Oracle International Corporation, Redwood Shores, CA (US)

(72) Inventors: Biju Narayanan, Trivandrum (IN); Harish Subramanian, Trivandrum (IN); Jibu Thomas Thomas, Chenkottukonam (IN)

(73) Assignee: Oracle International Corporation, Redwood Shores, CA (US)

( * ) Notice: Subject to any disclaimer, the term of this patent is extended or adjusted under 35 U.S.C. 154(b) by 63 days.

(21) Appl. No.: 17/150,238

(22) Filed: Jan. 15, 2021

(65) Prior Publication Data

US 2022/0004463 A1 Jan. 6, 2022

(30) Foreign Application Priority Data

Jul. 1, 2020 (IN) .............................. 202041027944

(51) Int. Cl.
*G06F 11/14* (2006.01)
*H04L 67/10* (2022.01)
*G06F 9/50* (2006.01)

(52) U.S. Cl.
CPC ........ *G06F 11/1464* (2013.01); *G06F 9/5072* (2013.01); *G06F 9/5077* (2013.01); *G06F 11/1446* (2013.01); *G06F 11/1451* (2013.01); *G06F 11/1453* (2013.01); *G06F 11/1469* (2013.01); *H04L 67/10* (2013.01)

(58) Field of Classification Search
CPC ............... G06F 9/5072; G06F 11/1446; G06F 11/1453; G06F 11/1464; G06F 11/1469; G06F 9/5077; G06F 11/1451; H04L 67/10
USPC .................................................. 711/165, 154
See application file for complete search history.

(56) References Cited

U.S. PATENT DOCUMENTS

| 10,379,968 | B2 | 8/2019 | Stowell et al. |
| 2013/0013569 | A1 | 1/2013 | Pafumi et al. |
| 2015/0370647 | A1* | 12/2015 | Gaza ................... H04L 67/1095 707/652 |
| 2018/0300203 | A1 | 10/2018 | Kathpal et al. |
| 2020/0133795 | A1 | 4/2020 | Rhodes et al. |

OTHER PUBLICATIONS

Marozzo et al., "P2P-MapReduce: Parallel data processing in dynamic cloud environments", 2011 (Year: 2011).*

(Continued)

*Primary Examiner* — David Yi
*Assistant Examiner* — Zubair Ahmed
(74) *Attorney, Agent, or Firm* — Invoke

(57) ABSTRACT

A cloud manager restores a backup of a distributed environment by comparing a stack of a current distributed environment to a backup stack of the backup of the distributed environment. The cloud manager identifies a difference between a first number of nodes in the first set of nodes specified in the first stack and a second number of nodes in the second set of nodes specified in the second stack. The cloud manager restores the backup of the distributed environment by modifying a number of nodes in the current distributed environment based on the identified difference between the first number of nodes and the number of nodes in the second stack.

24 Claims, 10 Drawing Sheets

(56) References Cited

OTHER PUBLICATIONS

Backing Up Tableau Server, Version: Current, < https://help.tableau.com/current/guides/everybody-install/en-us/everybody_admin_backup.htm >.

Backing up virtual machines, Acronis International GmbH, 2003-2020, 2014, < https://www.acronis.eom/en-us/support/documentation/AcronisBackupAdvancedVCloud/index.html#24559.html >.

Cisco Identity Services Engine User Guide, Release 1.2, Publication Date: Aug. 3, 2017, < https://www.cisco.eom/c/en/us/td/docs/security/ise/1-2/user_guide/ise_user_guide.pdf>.

Data Recovery, Dec. 2, 2020 < htttps://helpcenter.veeam.com/docs/backup/vsphere/data_recovery.html?ver=100 >.

Distributed and High Availability Tableau Server Installations, Version: Apr. 2019, Publication Date: 2019, < https://help.tableau.com/v2019.4/server/en-us/distrib_ha.htm >.

Introduction to Acronis Backup Advanced for vCloud, Publication Date: Aug. 12, 2014, < https://www.acronis.eom/en-us/support/documentation/AcronisBackupAdvancedVCloud/index.html#24017.html >.

Ngo et al., "Enterprise Application Backup and Restore in Cloud Computing," International Journal of Computer and Electrical Engineering, vol. 8, No. 2, Apr. 2016, pp. 169-176.

Perform a Full Backup and Restore of Tableau Server, Version: Apr. 2020, < https://help.tableau.com/current/server/en-us/backup_restore.htm >.

Recovering files from a virtual machine backup, Acronis International GmbH, 2003-2020, 2014, < https://www.acronis.eom/en-us/support/documentation/AcronisBackupAdvancedVCloud/index.html#27569.html >.

Veeam Backup Enterprise Manager, Publication Date: Jan. 31, 2020, < https://helpcenter.veeam.com/docs/backup/hyperv/enterprise_manager.html?ver=100>.

* cited by examiner

BACKUP AND RESTORE OF DISTRIBUTED ENVIRONMENTS

INCORPORATION BY REFERENCE; DISCLAIMER

This application is hereby incorporated by reference: India application no. 202041027944 filed on Jul. 1, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to backing up and restoring distributed environments. In particular, the present disclosure relates to restoring distributed environments having changed nodes, configurations, and/or data.

BACKGROUND

A distributed computing environment may include a large number of components, including compute nodes and application nodes. Generally, nodes refer to systems or devices connected to another system or device. Compute nodes include, for example, physical machines, virtual machines (VMs), and data storage. Application nodes include, for example, end-user applications, user interfaces, database applications, middleware applications, and search engine applications. Each node is associated with a set of configurations. The configurations affect how the nodes are implemented (such as, node type, shape, disk space, domain, subnet). Additionally, or alternatively, the configurations affect how the nodes communicate with each other (such as, dependencies, Internet Protocol (IP) address of a node itself, IP addresses of dependent or requisite nodes).

Backups associated with the distributed computing environment may be generated to provide a means to restore the distributed computing environment to a previous state in the event of hardware failure, software failure, and/or human error. For example, during operation of a distributed environment, a system administrator may request to back up a particular node in a distributed environment at a particular time. Subsequently, an error may occur on the particular node. The system administrator may then request to restore the particular node to the state that existed at the particular time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
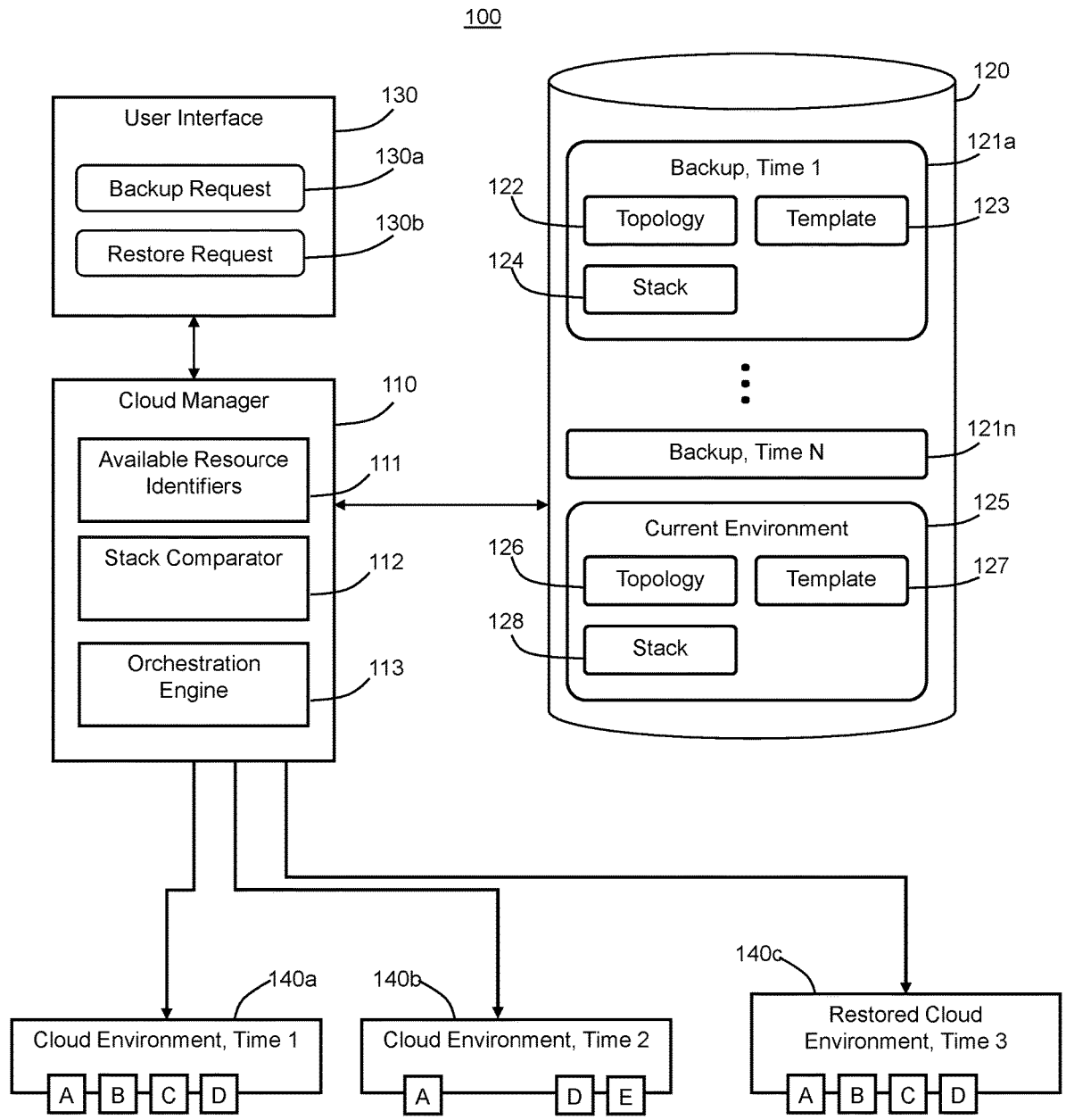
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. BACKUP AND RESTORATION OF DISTRIBUTED ENVIRONMENT
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments restore a distributed computing environment, including components in the computing environment (including compute nodes, and application nodes running on each compute node), and interconnections between the components. A stack specifies the topology of the distributed environment, the configurations of the nodes in the distributed environment, applications running on the nodes, and interconnections between the nodes. For example, a stack may specify a certain number of virtual machines running in a distributed environment, each virtual machine having different applications and configurations. The stack may further specify a certain number of database nodes and an interconnection relationship between the virtual machines and the database nodes.

One or more embodiments restore the environment by comparing a stack of the current environment to the stack of the backup environment. The comparison may yield three types of results: (1) components that have been added in the current environment compared to the backup environment, (2) components that have been deleted from the current environment relative to the backup environment, and (3) components that are in both the current and the backup environments. For nodes that have been added in the current environment compared to the backed-up environment, the nodes are deleted. The computing resources (such as, memory, and/or CPU) assigned to the deleted nodes become available for other nodes and/or applications in the environment. For nodes that have been deleted from the current environment relative to the backed-up environment, the nodes are added. For components that are in both the current and the backup environments, the components remain. However, the components may be re-configured based on configurations indicated by the backup stack. Additionally, or alternatively, transactional data associated with the components may be restored from the backup stack. Hence, by performing a preparatory step in the restoration process that compares the current and backup stacks to determine differences, components that are in both the current and the backup environments need not necessarily be re-provisioned. Components that are in both the current and the backup environments may experience a downtime for reconfiguration and/or reattaching transactional data disks but the downtime is generally shorter than a complete re-provisioning process.

One or more embodiments identify dependencies among nodes that had been deleted, as indicated in the stack of the backup environment, and determines a sequence for provisioning the components based on the dependencies. For examples, a backup stack may identify a particular middle tier node as being dependent on a database node. A cloud manager may provision and start up the database node prior to the particular middle tier node. Hence, a cloud manager may take advantage of the specificity of the information indicated in a stack to provision components in an order that matches with the associated dependencies.

One or more embodiments track resource identifiers utilized by the cloud environments, such as physical IP addresses, physical memory addresses, or unique resource identifiers associated with one or more nodes. A cloud manager ensures that one or more resource identifiers that are assigned to a component within an existing backup are not returned to a pool of available resource identifiers. Hence, the resource identifier is reserved for the component until all backups including the component are deleted. If the component is deleted from the distributed environment, but the backup is later restored, then the component is re-provisioned in the restored environment with the same resource identifier.

2. Architectural Overview

In one or more embodiments, a computing environment may be implemented in a cloud network. Embodiments and/or examples relating to computer networks are described below in Section 5, titled "Computer Networks and Cloud Networks."

In one or more embodiments, a computing environment includes a set of compute nodes. A compute node is a resource on which an application node is executed. Examples of compute nodes include a physical machine, a virtual machine (VM), and a data storage device.

Each compute node is associated with a set of configurations. Various compute node configurations may be used.

A compute node configuration may include an operating system (OS). Examples of OS's include Linux and Windows.

A compute node configuration may be based on application nodes to be deployed. For example, one option for a compute node configuration may be a database (DB) system, which is a system for running a general database. Another option for a compute node configuration may be database applications, which is an application-specific database on top of a database system. Another option for a compute node configuration may be a search application, which is an application for searching a database application. Another option for a compute node configuration may be full-tier application nodes, which includes a database, an application server, and a web server. Another option for a compute node configuration may be middle-tier application nodes, which includes an application server, and a web server. Another option for a compute node configuration may be a client, which includes client components used to deploy a computing environment.

A compute node configuration may be described as having a node shape. If the node is a VM, then the node may be associated with a VM shape. If the node is a bare metal (BM) system, then the node may be associated with a bare metal shape.

A compute node configuration may characterize a size of a disk space, such as 256 GB, 512 GB, 1024 GB, or any other size.

In one or more embodiments, a computing environment includes a set of application nodes. An application node executes on a compute node. Examples of application nodes include a DB application, an application server, a web server, a search application. A particular set of one or more application nodes may be specified in a deployment package (DPK). In the present specification, the term "components" may refer to both compute nodes and application nodes. In other words, the term "component of a computing environment" refers to compute nodes or application nodes in the computing environment, and to the devices, systems, connections, and applications that make up the compute nodes and application nodes in the computing environment.

Each application node is associated with a set of configurations. Various application node configurations may be used. An application node configuration may be a subnet used for implementing the application node. The subnet may be part of a cloud network used for implementing the computing environment as a whole.

Application node configurations may include a region and an availability domain. A region is a localized geographic area, and an availability domain is one or more data centers located within a region. A region is composed of several availability domains.

Application node configurations may include a subnet, a listener port number, a connect identifier (ID), a Uniform Resource Identifier (URI) or file path, an operator ID, an access ID, a DB name, a Pluggable Database name, an administrator username, a web server domain, an authentication domain, a hypertext transfer protocol (HTTP) port, a hypertext transfer protocol secure (HTTPS) port, a Jolt port, a WSL port.

In one or more embodiments, a computing environment is implemented on using one or more data volumes. The data volumes store binary files and/or application data associated with compute nodes and/or application nodes. Binary files include executable code of a compute node and/or an application node. Application data, also referred to as transactional data, includes data obtained by a compute node and/or an application node through an application programming interface (API) and/or user interface. Application data also includes data derived from other data obtained by a compute node and/or an application node through an application programming interface (API) and/or user interface. As an example, for an application node executing a human capital management application, application data may include names and biographical information of employees of a company, and a number of employees per office location. As another example, for an application node executing a financial management application, application data may include financial transactions of a company, and a balance of the company. In one or more embodiments, binary files and application data are stored in separate data volumes. Data volumes storing binary files are referred to as "boot volumes" and data volumes storing application data are referred to as "block volumes."

In one or more embodiments, a cloud manager is configured to manage a cloud computing environment or a distributed computing environment. The cloud manager is configured to receive a specification of a topology and a template. The topology and template for an environment may be referred to as the environment specification. The topology and/or template may be specified via user input. A topology includes definitions of a set of compute nodes to be implemented in a computing environment. A template includes definitions of a set of application nodes to be implemented in a computing environment. The template may also specify which topology to be used in conjunction with the specified application nodes. The topology and the template may be separate documents or may be the same document. The topology and template may be in the same format or different formats. An example format for a topology or a template is JavaScript Object Notation (JSON). The term "specification" may be used herein to refer to one or more documents specifying the compute nodes and the application nodes of a computing environment.

The cloud manager is configured to receive a backup request to back up a distributed environment. The backup request may be made via user input. As used herein, the term "distributed environment" may refer to an existing computing environment that is accessible to one or more clients via a network.

The cloud manager is associated with one or more user interfaces. A user interface refers to hardware and/or software configured to facilitate communications between a user and a cloud manager. A user interface renders user interface elements for presenting and receiving information to and from a user. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, the cloud manager backs up and restores a cloud environment using a stack that includes necessary information for provisioning compute nodes and application nodes for a computing environment. The stack identifies hardware interconnections that implement configurations of components in the cloud environment. The stack identifies software interconnections between components in the cloud environment, such as virtual IP addresses, and port numbers, that are used for communications between certain components. The stack identifies dependencies between components in the cloud environment, such as which node calls or invokes a service of another node. A node that calls or invokes a service of another node is referred to as being "dependent" on the other node. The stack identifies the sequence of operations necessary to provision the cloud environment, including the sequence in which to provision the nodes. Generally, a node that implements a service used by another node is provisioned before the other node. The stack identifies configurations of compute nodes and application nodes. The stack may be a separate document from the topology and the template. An example format for a stack may be JSON.

In one or more embodiments, the cloud manager includes hardware and/or software configured to perform operations for backing up and restoring a distributed environment described below with reference to FIGS. 3A-B.

FIG. 1 illustrates a system 100 in accordance with one or more embodiments. As illustrated in FIG. 1, the system includes a cloud manager 110 in communication with a data repository 120 and a user interface 130. In one embodiment, the cloud manager manages user interactions with one or more cloud environments 140 or distributed environments. For example, users may interact with the cloud manager to configure or modify a cloud or distributed environment accessed by one or more users to run one or more applications.

The cloud manager 110 receives from the user, via the user interface 130, backup requests 130a and restore requests 130b. When the cloud manager 110 receives a backup request 130a, the cloud manager 110 stores the backup 121a-121n of the cloud environment in the data repository 120. One or more embodiments include user-initiated backups and/or regularly-scheduled backups. The data repository 120 also stores the snapshot of the current environment 125, including the topology 126, template 127, and the stack 128 of the currently-running distributed environment.

In an embodiment, the user interface 130 displays information associated with a set of one or more cloud environments provisioned and/or managed by a cloud manager. The user interface 130 may display an identifier of a topology and/or one or more templates used for provisioning each cloud environment. An icon associated with each cloud environment is selectable by a user to request backing up of the cloud environment. Hence, the user can easily view the topology and one or more templates associated with a particular cloud environment. Based on the topology, template, and/or stack, the user can determine what applications, patches, updates are running in the cloud environment, what nodes (such as virtual machines, databases) the applications are being executed on, and what configurations the nodes are associated with. Based on the above information, the user can easily select which cloud environments to back up and restore.

In one or more embodiments, the data repository 120 stores every backup of the cloud environment. In one or more embodiments, the backups are snapshot backups, including the topology 122, template 123, and stack 124 of the environment. The snapshot backups specify every component provisioned in the environment, the configuration of every node, the interconnection of every node, and application data associated with every component. In one or more alternative embodiments, each successive backup is a record of the changes made to the cloud environment since the last backup, so that elements of the cloud environment that are the same as the previous backup are not re-saved in the new backup.

The data repository 120 is any type of storage unit and/or device (e.g., a file system, database, collection of tables, or any other storage mechanism) for storing data. Further, the data repository 120 may include multiple different storage units and/or devices. The multiple different storage units and/or devices may or may not be of the same type or located at the same physical site. Further, the data repository 120 may be implemented or executed on the same computing system as the cloud manager 110. Alternatively, or additionally, the data repository 120 may be implemented or executed on a computing system separate from the cloud manager 110. The data repository 120 may be communicatively coupled to the cloud manager via a direct connection or via a network.

In one or more embodiments, the cloud manager 110 maintains a list or table of available resources identifiers 111 that may be assigned to a node in a cloud environment. The available resources identifiers 111 include any identifier that may be used to identify a node in a cloud environment, such as physical Internet Protocol (IP) addresses, and system identifiers that are unique to each component within a distributed environment. The cloud manager 110 reserves one or more resource identifiers that are assigned to a node within any existing backup by leaving the resource identifiers out of the list of available resource identifiers 111, so that the resource identifier is not assigned to any other environment or node. In this manner, even if a node is deleted from a distributed environment, and is later restored from a backup, the cloud manager is able to re-assign the same resource identifier that the node previously used without conflict with any other nodes or environments.

By way of example, in one or more embodiments, the cloud manager 110 stores a list or table of available resource identifiers. When a new node is created or provisioned, the cloud manager 110 refers to the pool of available resource identifiers. The cloud manager 110 assigns one of the available resource identifiers to the new node.

In one or more embodiments, the cloud manager 110 stores a list or table of reserved resource identifiers (not illustrated). When a new node is created or provisioned, the cloud manager 110 refers to the pool of reserved resource identifiers. If a particular resource identifier is in the reserved pool, then the cloud manager does not assign the particular resource identifier to the new node. Even if the new node requests to have the particular resource identifier, the cloud manager 110 rejects the request and assigns a different resource identifier to the new node.

In one or more embodiments, a stack comparator 112 compares the stack of the requested backup with a stack of the current environment. The stack comparator 112 identifies changes in the cloud environment, including changes in nodes, applications, architecture, or interconnections between nodes, etc. An orchestration engine 113 provisions the restored cloud environment based on the comparison of the backup stack with the current stack. The orchestration engine 113 assigns to the nodes in the restored environment any resources identified in the backup stack. For example, the orchestration 113 provisions the nodes of the restored environment with interconnections (e.g. communications channels or ports), applications to be run on the nodes, memory to be assigned to the nodes, application data, boot data, and operating systems identified by the backup stack. In one embodiment, the orchestration engine 113 maintains any portions of the current cloud environment that were present in the backup, and changes the remaining portions of the current cloud environment to reflect the changes from the backed-up cloud environment. In one or more embodiments, the orchestration engine 113 determines a provisioning order based on the backup stack, and provisions nodes in a restored environment according to the provisioning order. Specifically, if the orchestration engine 113 identifies a first component as being dependent on a second component, the orchestration engine 113 provisions the second component prior to the first component.

As an example, FIG. 1 shows a first cloud environment 140a backed up at time 1. The first cloud environment includes nodes A, B, C, and D. Over time, the cloud environment is modified, and the cloud manager 110 manages the cloud environment 140b at time 2. The cloud environment 140b includes nodes A, D, and E. The cloud manager 110, at time 3, restores the cloud environment 140a to generate the restored cloud environment 140c, including nodes A, B, C, and D.

In one embodiment, restoring the cloud environment or the distributed environment includes restoring the run-time components (including compute nodes and application nodes) of the backed-up cloud environment.

In one embodiment, the nodes of the cloud environment are configured to run applications accessible by users, and the cloud manager may itself be an application run on the cloud environment that is accessible by users.

Figure 2:
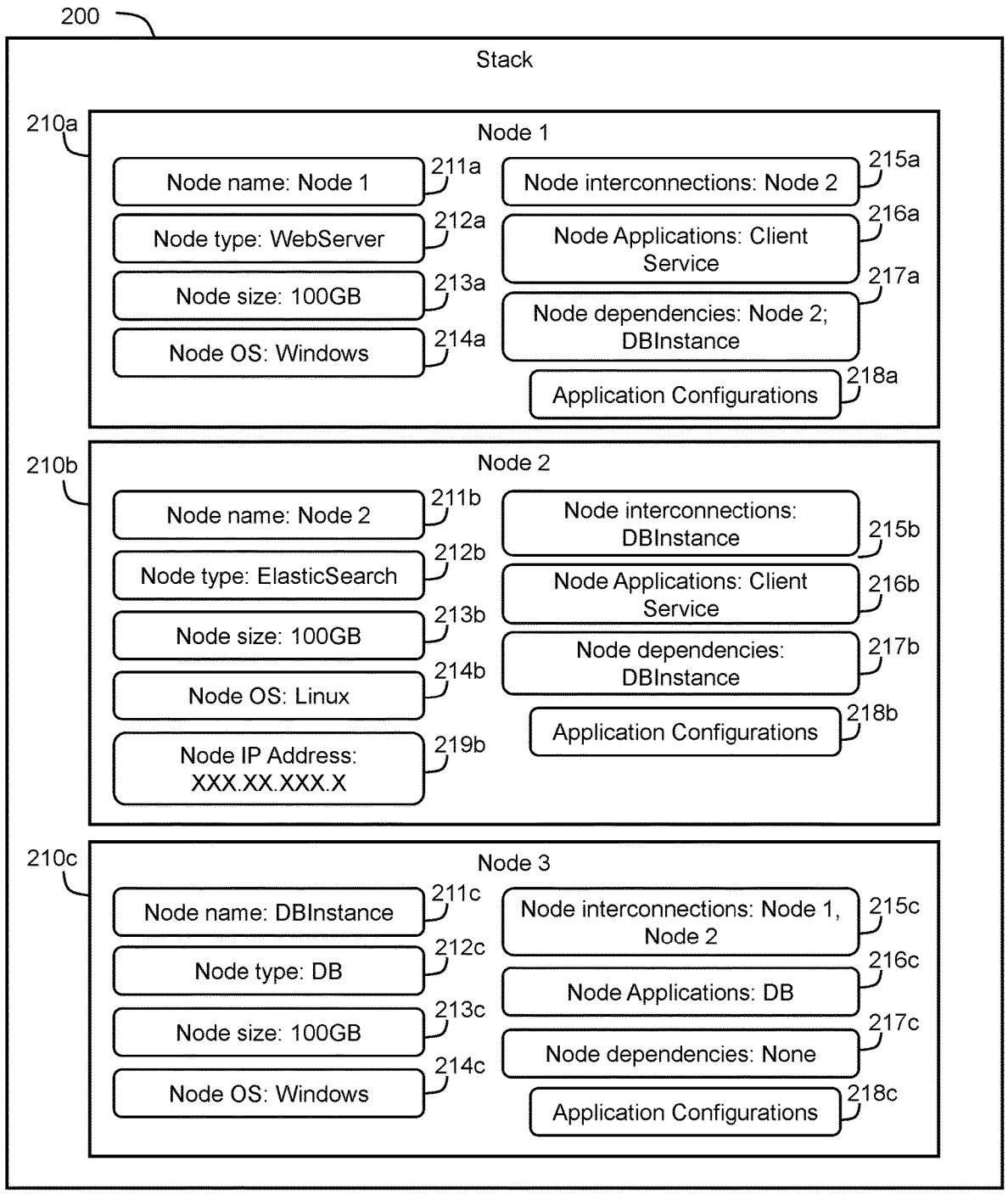
FIG. 2 illustrates an example of a backup stack in accordance with one or more embodiments.

FIG. 2 is an example of a stack 200 according to one or more embodiments. The stack 200 of FIG. 2 may correspond to the stack 124 of any of the backups 121a-121n. The structure of the stack 200 also corresponds to the structure of the stack 128 in the current environment 125 of FIG. 1. While the stack 200 is depicted in FIG. 2 in a block diagram for purposes of illustration, the stack 200 may be implemented as computer-readable code.

The stack 200 specifies nodes 210a-210c. For each node 210a-210c, the stack 200 specifies a node name 211a-211c, a node type 212a-212c, a node size 213a-213c, a node operating system 214a-214c, any interconnections between the node and another node 215a-215c, applications running on the node 216a-216c, any dependencies of the node on any other node 217a-217c, application configurations 218a-218c of applications running on the nodes, and/or any required provisioning sequence of the components. The stack 200 further specifies that the node 210b is assigned a physical IP address 219b. The stack 200 may also specify other types of resource identifiers for a particular node.

In an embodiment, a cloud manager 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Backup and Restoration of Distributed Environment

Figure 3A:
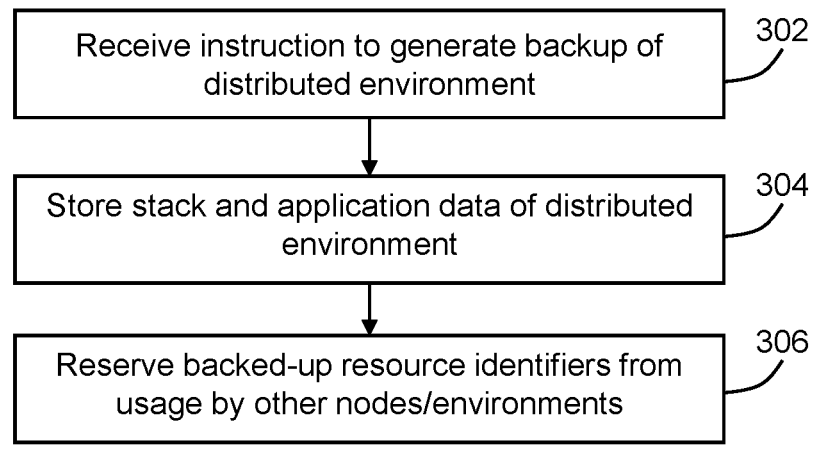
FIGS. 3A and 3B illustrate example operations of backing up and restoring a distributed environment according to one or more embodiments.

FIG. 3A illustrates a flow diagram of an operation for performing a backup according to one or more embodiments. FIG. 3B illustrates a flow diagram of an operation for restoring a backup according to one or more embodiments. FIG. 3C illustrates a flow diagram of an operation for deleting a backup according to one or more embodiments.

As illustrated in FIG. 3A, a cloud manager determines whether an instruction is received to generate a backup of a distributed environment (Operation 302). The instruction may be received via a user interface or by program or application that is programmed to generate the instruction to generate the backup. For example, an application may initiate a request to back up the distributed environment according to a predetermined schedule. Alternatively, the application may initiate the request to back up the distributed environment upon occurrence of an event, such as a predefined change to the distributed environment.

Based on receiving the instruction, the cloud manager stores the stack and application data of the currently-running distributed environment. As discussed above, the stack specifies the topology of the distributed environment, the configurations of the nodes in the distributed environment, applications running on the nodes, and interconnections between the nodes (Operation 304). Backing up the distributed environment includes storing a copy of the stack of the distributed environment. The stack specifies the topology of the distributed environment, including nodes, configurations of the nodes, applications running on the nodes, application data stored and accessed by the nodes, and interconnections between the nodes.

In one or more embodiments, the cloud manager reserves any resource identifiers relied on by backed-up nodes from being used by other nodes or distributed environments (Operation 306). In an embodiment, the cloud manager refrains from releasing resource identifiers assigned to nodes within the backup to a pool of available resource identifiers. Even if a node is deleted in the runtime distributed environment, the resource identifier of the node is not released back into the available pool.

In another embodiment, the cloud manager may additionally or alternatively maintain a "reserved resource identifier list." The cloud manager adds any resource identifiers assigned to nodes within the backup to the list. When new nodes are provisioned, the cloud manager checks the list to ensure that identifiers in the list are not assigned to newly-provisioned nodes.

Figure 3B:
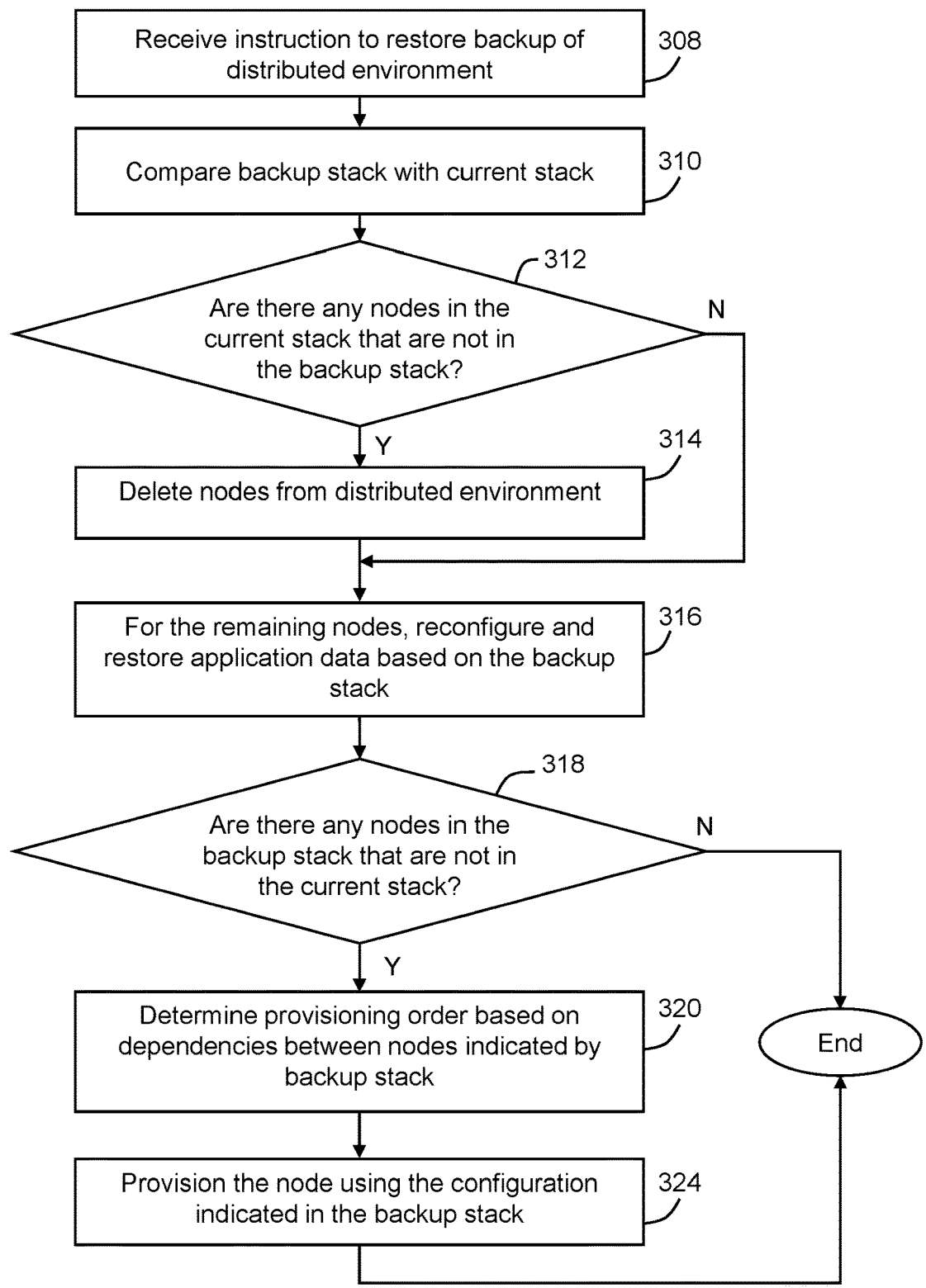
Figure 3C:
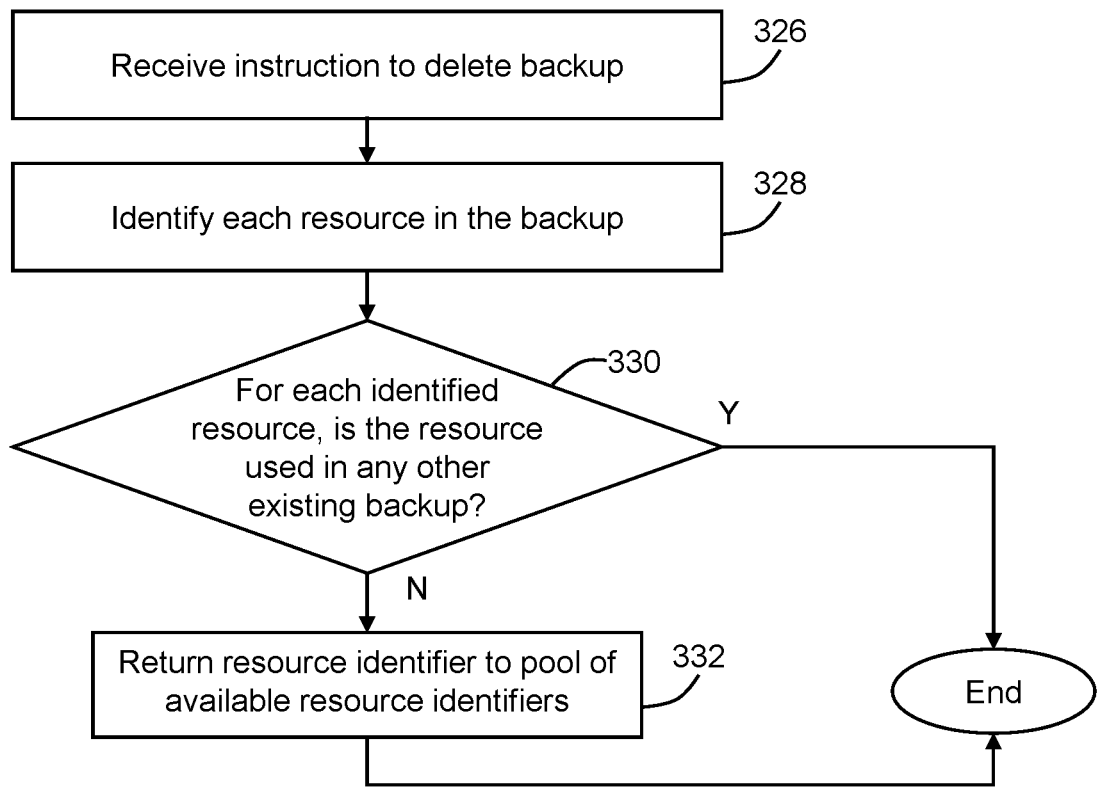
FIG. 3C illustrates an example of operations for deleting a backup according to one or more embodiments.

FIG. 3B illustrates a flow diagram of an operation for restoring a backup according to one or more embodiments.

The cloud manager receives an instruction to restore a distributed environment from a backup (Operation 308). For example, a user may interact with a user interface to select a backed-up distributed environment to be restored.

The cloud manager compares the stack of the currently-running distributed environment to the backup stack (Operation 310). Each of the current stack and the backup stack may be stored in a data repository. Comparing the stacks may include comparing code or text in one stack to code or text in the other stack. Comparing the stacks may also include comparing data pointed to by code in the stacks.

The cloud manager determines whether there are any nodes in the current stack that are not in the backup stack (Operation 312). In one embodiment, the cloud manager compares a number of nodes of each node type in the backup stack with the number of nodes of the same node type in the stack of the current distributed environment. For example, the cloud manager may determine that the backup stack includes a database node, three middle-tier nodes, and a web services node. The cloud manager may determine that the current stack includes only two middle-tier nodes, but includes an additional search-engine node. Accordingly, the cloud manager identifies that there is a difference in the number of middle-tier type nodes (i.e., a difference of one node) and the number of search-engine type nodes (i.e., a difference of one node) between the backup stack and the current stack. In another embodiment, the cloud manager compares node identifiers in one stack to node identifiers in the other stack. The cloud manager determines whether any node identifiers are different in the two stacks.

If the cloud manager determines that the stack of the current distributed environment specifies at least one node that is not present in the stack of the backup environment, the cloud manager deletes the node (Operation 314). Deleting the node may include deleting node configuration information, and node application data. Any applications running on the node are stopped and data associated with the applications may be deleted. In one or more embodiments, any nodes not specified in the backup stack are affirmatively deleted.

Deleting the node may also include releasing any physical resources assigned to the node. For example, physical servers and/or disks used implement the node may be made available for other nodes in the distributed environment. Physical devices, memory, and other physical resources may be made available for provisioning to other components in the environment.

Various ways of releasing physical resources of a deleted node may be used. As an example, a cloud manager maintains a pool of available physical resources for executing components of a distributed environment. When the cloud manager provisions a new node, the cloud manager identifies a physical resource (such as a server) from the pool. The cloud manager executes and/or implements the new node on the identified physical resource. When the cloud manager deletes the node, the cloud manager returns the physical resources of the node back to the pool, so that the physical resources are available for another node. As another example, each physical resource is associated with a flag indicating whether the physical resource has been assigned to a node within a distributed environment. When the cloud manager provisions a new node, the cloud manager identifies a physical resource whose flag is set to "false." The cloud manager executes and/or implements the new node on the identified physical resource. The cloud manager sets the flag of the physical resource to "true." When the cloud manager deletes the node, the cloud manager resets the flag of the physical resource to "false," so that the physical resource is available for another node.

Deleting the node may also include releasing any resource identifiers assigned to the node. For example, when deleting a particular node, the cloud manager may determine whether any resource identifiers assigned to the particular node are specified in any other backup. If the resource identifiers assigned to the particular node are not specified in any backup, the resource identifiers may be returned to a pool of available resource identifiers. Alternatively, if the cloud manager determines the resource identifiers assigned to the particular node are specified in one or more backups, the resource identifiers are not returned to the pool of available resources.

For any nodes remaining in the distributed environment, the cloud manager reconfigures and restores application data based on the backup stack (Operation 316). In one or more embodiments, the nodes that are in both the current stack and the backup stack are not re-provisioned. Instead, the cloud manager compares the configuration of these nodes in the current and backup stacks. If there are no differences, the cloud manager does not need to perform any reconfiguration. If there are differences, the cloud manager reconfigures these nodes based on the configurations indicated by the backup stack.

Reconfiguring the components may include changing a memory size, configuring a gateway URL, loading gateway connectors, setting gateway properties such as passwords, and registering a node to a network. Reconfiguration may be performed using configuration plugins, such as Automated Configuration Management (ACM) plugins, that apply configurations to a node without requiring re-provisioning the node. In an embodiment where separate volumes store binary files and application data, reconfiguring involves reconfiguring programs that are on the boot volume. In one or more embodiments, the sequence in which configuration plugins are applied is determined based on dependency information specified by the backup stack.

In one or more embodiments, reconfiguring a boot volume includes allowing user input regarding a desired configuration of a boot volume. For example, a boot volume specified in the stack of the current distributed environment may include configuration information with updated security or compatibility information. The cloud manager may request user input regarding whether to revert to the configuration of the backup stack or retain one or more configuration elements of the current stack when restoring the backup.

In one or more embodiments, the cloud manager compares the application data of the remaining nodes in the current and backup stacks. If there are no differences, the cloud manager does not need to restore any application data.

If there are differences, the cloud manager may modify the application data of the nodes in the current environment. In an embodiment where separate volumes store binary files and application data, the cloud manager detaches a current block volume of the node and re-attaches an old block volume of the node from the backup environment.

In one or more embodiments, for nodes that are specified both in the backup stack and the current stack, the boot volume is retained in the restored environment, block volumes from the current environment are deleted, and block volumes from the backup environment are re-attached to the boot volumes.

The cloud manager further determines whether the backup stack specifies any nodes that are not present in the stack of the current distributed environment (Operation 318). For example, the cloud manager may determine that there are four nodes of a particular node type in the stack of the backup environment, but only two nodes of the particular node type in the stack of the current distributed environment.

The cloud manager refers to the configuration information in the backup stack to determine a provisioning order for the nodes that are specified in the backup stack but not in the stack of the current environment (Operation 320). For example, the cloud manager may identify nodes A and B as being specified in the backup stack and not in the stack of the current distributed environment. The cloud manager may further determine that the backup stack specifies node A as being dependent on node B, such that node B should be provisioned prior to node A. Alternatively, the cloud manager may identify a node in the backup stack that is dependent on a node that is defined in both the backup stack and the stack of the current environment. In one or more embodiments, the cloud manager may determine that there is no dependency of a node on any other node, and the nodes may be provisioned based on any predetermined order.

The cloud manager provisions the nodes, which were specified in the backup stack and absent from the current stack, according to the identified provisioning order (Operation 324). In one or more embodiments, a node includes one or more boot volumes and one or more block volumes. Provisioning the node includes configuring one or more boot volumes of the node according to configurations indicated by the backup stack. Provisioning the node also includes attaching one or more block volumes, stored at the time of the backup, to the node. In one or more embodiments, the nodes are additionally or alternatively configured using configuration plugins, such as ACM plugins. The cloud manager applies configuration plugins to configure the nodes based on the backup stack. For example, the cloud manager determines a hostname, a port, and/or connection configurations from the backup stack, inputs the configuration information into configuration plugins, and executes the configuration plugins to apply the configurations to the nodes.

In one or more embodiments, the cloud manager identifies any components or elements that may either require updating, or which may be optionally updated. For example, if a node in a backed-up cloud environment is configured to run Application A, but the application has since been updated to run on a more recent version, the cloud manager may identify the mandatory or optional updates and may either notify a user of mandatory updates or provide the user with an option to implement optional updates when restoring the backed-up cloud environment.

In one or more embodiment, provisioning the node from the backup stack in the restored distributed environment includes assigning a resource identifier that the backup stack indicates for the node to the restored node of the restored distributed environment. The cloud manager determines, based on the backup stack, the resource identifier that is assigned. The cloud manager then assigns the resource identifier to the restored node. The cloud manager does not need to check whether any other components in the current distributed environment are using the resource identifier before assigning the resource identifier to the restored node. The cloud manager does not need to perform such a check because the resource identifier is reserved for the node at the time of backing up the backup environment.

FIG. 3C illustrates a flow diagram of an operation for deleting a backup according to one or more embodiments.

The cloud manager determines that an instruction has been received to delete a backup (Operation 326). For example, a user may interact with a user interface to delete a backup. Alternatively, a program or application may be programmed to automatically delete one or more backups. For example, an application may be programmed to automatically delete one or more backups if the system is restored with another backup. Alternatively, an application may be programmed to automatically delete one or more backups if the currently-running distributed environment is shut down and no backup is selected to run in its place.

The cloud manager identifies each resource identifier assigned to nodes in the backup environment (Operation 328). The cloud manager analyzes the backup stack to identify node configurations specifying assigned resource identifiers.

The cloud manager determines whether each resource identifiers is used in any other existing backup (Operation 330). The cloud manager analyzes other backup stacks. The cloud manager identifies assigned resource identifiers in each backup stack. The cloud manager compares each resource identifier specified in the backup stack to be deleted with resource identifiers in other backup stacks.

If a resource identifier specified in the backup stack to be deleted is also specified in at least one other backup stack, the cloud manager takes no action regarding the resource identifier. The resource identifier is not made available to any components of the distributed system.

On the other hand, if the resource identifier specified in the backup stack to be deleted is not found in any other backup stacks, the cloud manager may return the resource identifier to a pool of available resource identifiers (Operation 332). The resource identifier becomes available for other nodes in the distributed environment.

4. Example Embodiment

FIGS. 4A-4D illustrate an example embodiment of restoring a backup. For example, the process described below may correspond to the backup and restoration of the cloud environments 140a and 140c shown in FIG. 1.

Figure 4A:
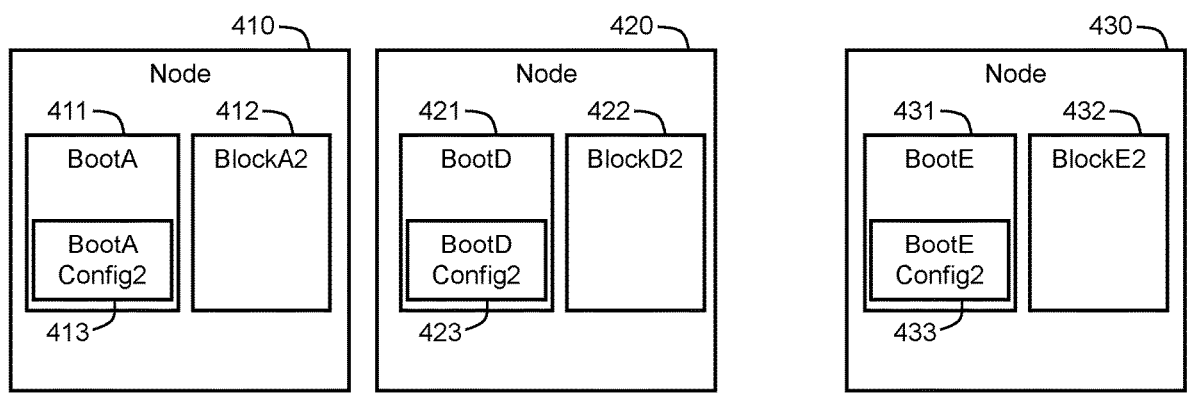
FIGS. 4A-4D illustrate an example embodiment of restoring a backup.

FIG. 4A illustrates current distributed environment 400a having nodes 410, 420, and 430. Node 410 has a boot volume 411 and a block volume 412. The boot volume 410 is a device containing an image for booting a compute instance in the environment 400a. The block volume 412 is a storage device accessible by the boot volume 411 for storing any data, such as application data and files, to be used by the boot volume 411 when running the environment 400a. The boot volume 411 is configured according to configuration data 413. Node 420 has a boot volume 421 and a block volume 422. The boot volume 421 is configured according to configuration data 423. Node 430 has a boot volume 431 and a block volume 432. The boot volume 431 is configured according to configuration data 433.

Figure 4B:
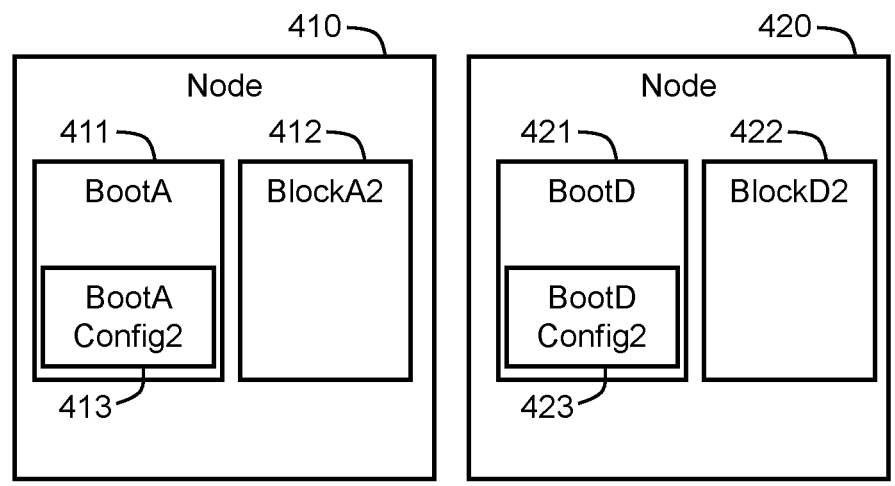

A cloud manager receives an instruction to restore a backup environment taken at a time prior to the time at which the current distributed environment 400a is running. The cloud manager may compare the stack of the backup with the current stack and determine that node 430 is not specified in the backup stack. Accordingly, as illustrated in FIG. 4B, the cloud manager deletes node 430.

Figure 4C:
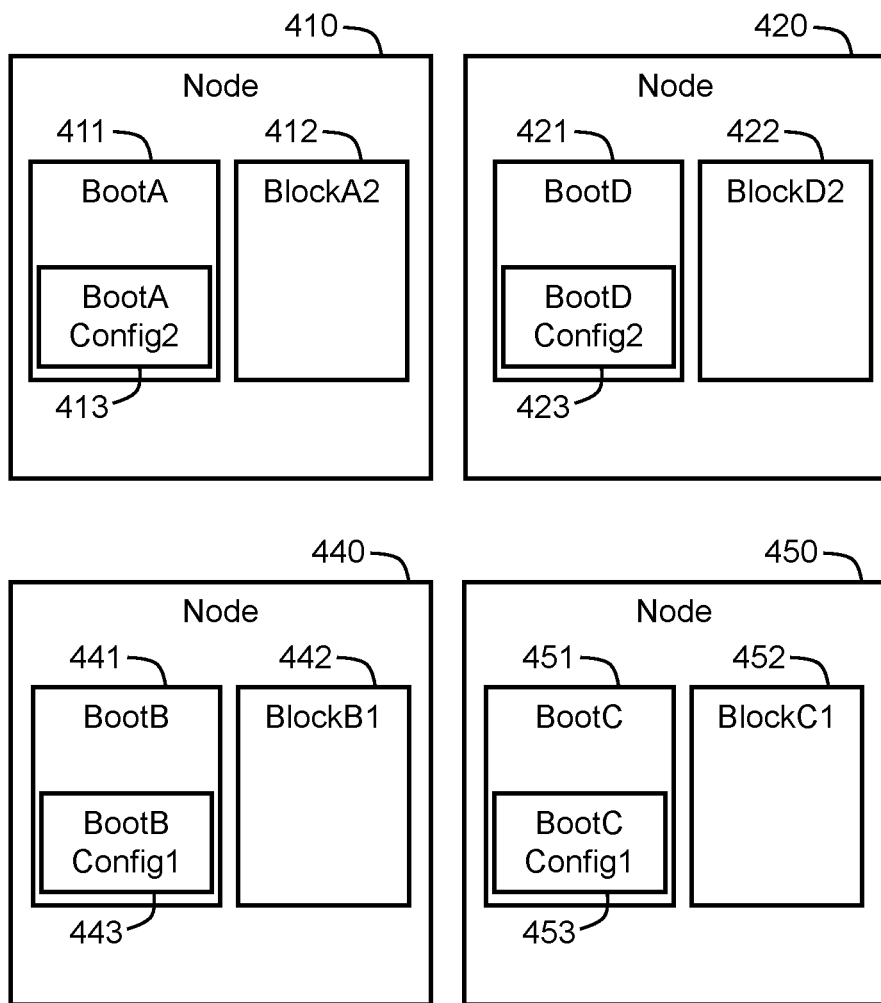

The cloud manager further determines that the backup stack specifies two nodes 440 and 450 that are not specified in the stack of the current distributed environment. As illustrated in FIG. 4C, the cloud manager adds nodes 440 and 450. Node 440 includes a boot volume 441 and a block volume 442. The boot volume 441 is configured according to configuration data 443 specified in the backup stack. Node 450 includes a boot volume 451 and a block volume 452. The boot volume 451 is configured according to configuration data 453 specified in the backup stack. The block volumes 442 and 452 are also configured as specified in the backup stack. The block volume 442 and 452 include the application data that is specified in the backup stack.

In one or more embodiments, after creating the volumes for the nodes 440 and 450, the cloud manager uses configuration plugins to configure the nodes 440 and 450 without communicating with nodes 410 and 420, and without requiring node 440 to communicate with node 450.

In one or more embodiments, the cloud manager determines from the backup stack that node 450 depends on node 440 and that node 440 must be provisioned prior to node 450 prior to connecting node 450 to node 440. The cloud manager may provision and start up the nodes according to the required order specified in the backup stack.

Figure 4D:
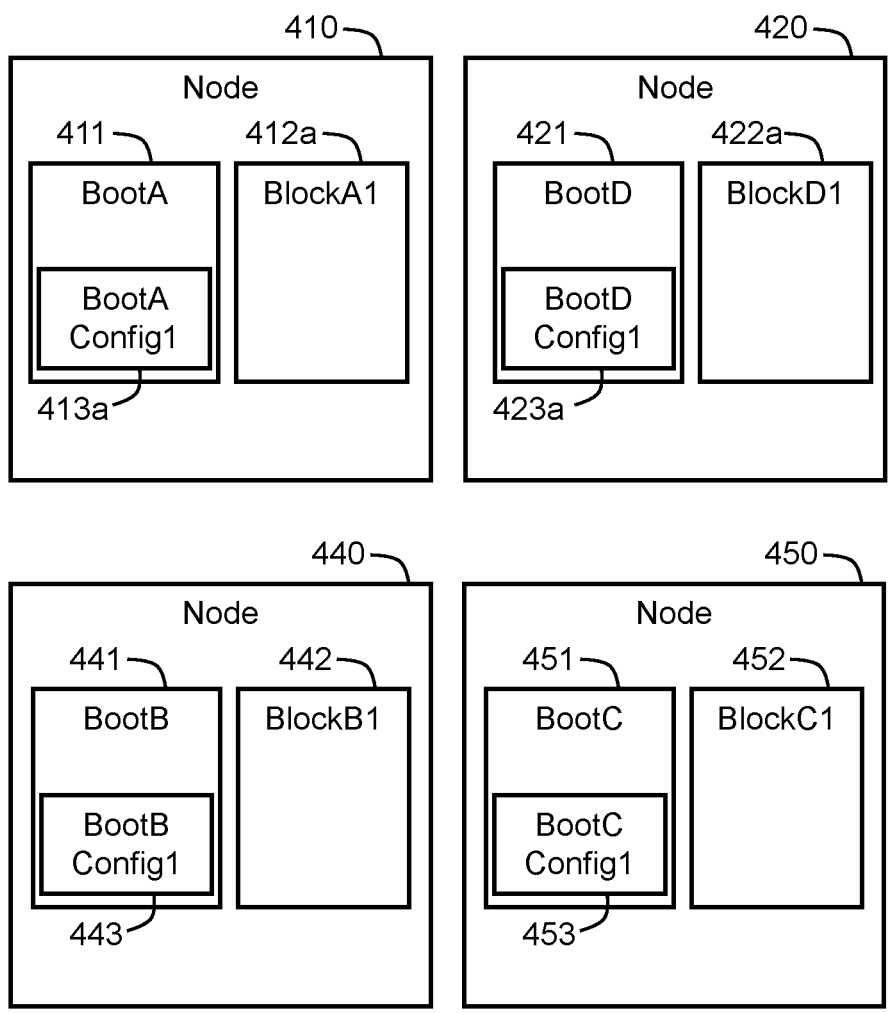

For nodes in both current and backup stacks, the cloud manager determines whether any nodes should be reconfigured based on configurations specified in the backup stack. As shown in FIG. 4D, the cloud manager reconfigures the boot volume 411 to have configuration settings 413a corresponding to the configuration settings specified in the backup stack. Likewise, the cloud manager reconfigures the boot volume 421 to have configuration settings 423a corresponding to the configuration settings specified in the backup stack.

In addition, the cloud manager may determine that block volumes 412 and 422 are different from the block volumes specified in the backup stack. Accordingly, the cloud manager re-attaches to the boot volumes 411 and 421 the block volumes 412a and 422a specified in the backup stack, including any files or data stored in the block volumes 412a and 422a. The restored distributed environment 400b includes each node 410, 420, 440, and 450 specified in the backup stack with the configurations specified in the backup stack.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
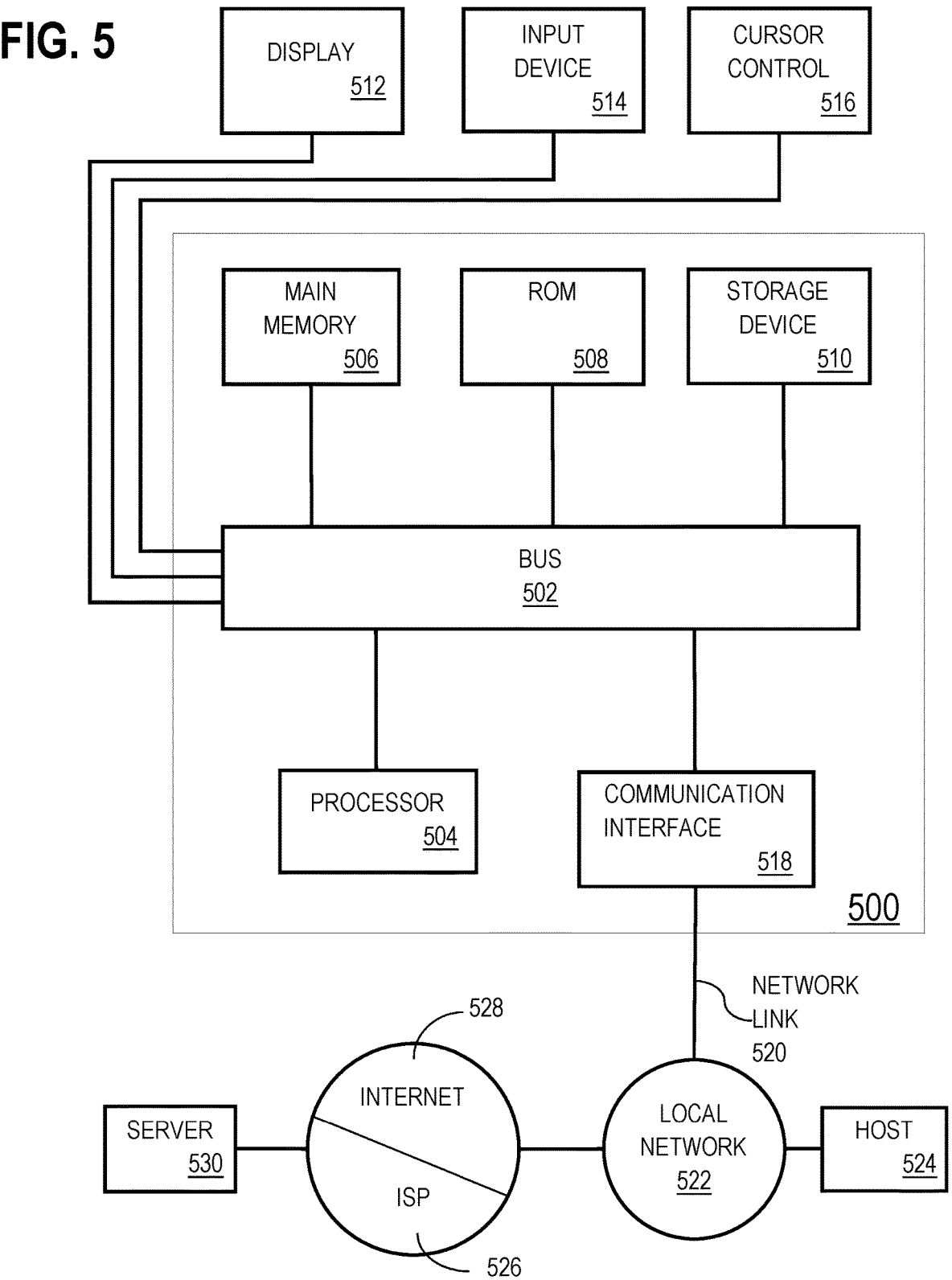
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which,
when executed by one or more processors, cause:
receiving an instruction to restore a backup of a distributed environment having two or more nodes;
responsive to receiving the instruction:
comparing a first stack of a current distributed environment to a second stack of the backup of the distributed environment,
wherein the first stack specifies a first set of nodes in the current distributed environment;
wherein the second stack specifies a second set of nodes in the backup of the distributed environment;
identifying a difference between a first number of nodes in the first set of nodes specified in the first stack and a second number of nodes in the second set of nodes specified in the second stack; and
restoring the backup of the distributed environment, wherein restoring the backup of the distributed environment includes modifying a number of nodes in the current distributed environment based on the identified difference between the first number of nodes and the number of nodes in the second stack.

2. The media of claim 1, wherein the first set of nodes and the second set of nodes are of a same node type.

3. The media of claim 1, wherein:
identifying the difference between the number of nodes in the first stack and the number of nodes in the second stack comprises: determining that the first number of nodes is less than the second number of nodes;
modifying the number of nodes in the current distributed environment according to the identified difference between the number of nodes in the first stack and the number of nodes in the second stack comprises: deleting at least one node.

4. The media of claim 3, wherein deleting the at least one node comprises: releasing resource identifiers such that the resource identifiers are available to other nodes.

5. The media of claim 3, wherein deleting the at least one node comprises: determining whether the at least one node is in any existing backup distributed environment; responsive to determining that the at least one node is not in any existing backup distributed environment, releasing a resource identifier associated with the at least one node such that the resource identifier is available to other nodes.

6. The media of claim 3, wherein deleting the at least one node comprises: determining whether the at least one node is in any existing backup distributed environment; responsive to determining that the at least one node is in an existing backup distributed environment, refraining from releasing a resource identifier associated with the at least one node.

7. The media of claim 1, wherein identifying the difference between the number of nodes in the first stack and the number of nodes in the second stack comprises:
determining that the first number of nodes is greater than the second number of nodes;
wherein modifying the number of nodes in the current distributed environment according to the identified difference between the number of nodes in the first stack and the number of nodes in the second stack comprises adding at least one node.

8. The media of claim 7, wherein adding the at least one node comprises: determining a dependency, indicated by the second stack, between a first node and a second node to be added;
determining a provisioning order of the first node and the second node based on the dependency;
adding the first node and the second node according to the provisioning order.

9. The media of claim 7, wherein adding the at least one node comprises: executing application on the at least one node that is specified by the second stack.

10. The media of claim 7, wherein the second stack further specifies:
properties of each node in the backup of the distributed environment; and
interconnections between the two or more nodes in the backup of the distributed environment;
wherein adding the at least one node comprises: configuring the at least one node based on properties of the at least one node indicated in the second stack.

11. The media of claim 7, wherein adding the at least one node comprises: configuring the at least one node to connect to another node based on interconnections of the at least one node indicated in the second stack.

12. The media of claim 1, wherein the first stack further specifies a third set of nodes in the current distributed environment;
wherein the second stack further specifies a fourth set of nodes in the backup of the distributed environment;
wherein a third number of the third set of nodes and a fourth number of the fourth set of nodes are same;
wherein the third set of nodes modifying the number of nodes in the current distributed environment is performed without stopping operation of the third set of nodes.

13. The media of claim 12, wherein the instructions further cause:
re-configuring the third set of nodes based on configurations in the backup of the distributed environment.

14. The media of claim 12, wherein the instructions further cause:
re-attaching to the third set of nodes one or more data repositories comprising transactional data from the backup.

15. The media of claim 1, wherein each of the first and second stacks further specifies:
applications running on each node.

16. The media of claim 1, wherein the second stacks further specifies: at least one dependency of a first node and a second node.

17. The media of claim 16, wherein the at least one dependency specifies an order required to start up the first node and the second node, comprising the first node starting up prior to the second node;
wherein restoring the backup of the distributed environment includes starting up the first node prior to the second node.

18. The media of claim 1, wherein restoring the backup of the distributed environment comprises:
identifying a first node in the second stack that is absent from the first stack;
creating the first node in the restored distributed environment;
identifying a resource assigned, by the second stack, to the first node; and
allocating the resource to the first node.

19. The media of claim 18, wherein the resource is a physical Internet protocol (IP) address.

20. A method comprising:
receiving an instruction to restore a backup of a distributed environment having two or more nodes;
responsive to receiving the instruction:
comparing a first stack of a current distributed environment to a second stack of the backup of the distributed environment,
wherein the first stack specifies a first set of nodes in the current distributed environment;
wherein the second stack specifies a second set of nodes in the backup of the distributed environment;
wherein the instructions further cause:
identifying a difference between a first number of nodes in the first set of nodes specified in the first stack and a second number of nodes in the second set of nodes specified in the second stack; and
restoring the backup of the distributed environment, wherein restoring the backup of the distributed environment includes modifying a number of nodes in the current distributed environment based on the identified difference between the first number of nodes and the number of nodes in the second stack.

21. The method of claim 20, wherein the first set of nodes and the second set of nodes is of a same node type.

22. The method of claim 20, wherein identifying the difference between the number of nodes in the first stack and the number of nodes in the second stack comprises:
determining that the first number of nodes is less than the second number of nodes;
wherein modifying the number of nodes in the current distributed environment according to the identified difference between the number of nodes in the first stack and the number of nodes in the second stack comprises deleting at least one node.

23. The method of claim 20, wherein identifying the difference between the number of nodes in the first stack and the number of nodes in the second stack comprises:
determining that the first number of nodes is greater than the second number of nodes;
wherein modifying the number of nodes in the current distributed environment according to the identified difference between the number of nodes in the first stack and the number of nodes in the second stack comprises adding at least one node.

24. A system, comprising:
one or more processors; and
memory storing instructions that, when executed by the one or more processors, cause the system to perform:
receiving an instruction to restore a backup of a distributed environment having two or more nodes;
responsive to receiving the instruction:
comparing a first stack of a current distributed environment to a second stack of the backup of the distributed environment,
wherein the first stack specifies a first set of nodes in the current distributed environment;
wherein the second stack specifies a second set of nodes in the backup of the distributed environment;
wherein the instructions further cause:
identifying a difference between a first number of nodes in the first set of nodes specified in the first stack and a second number of nodes in the second set of nodes specified in the second stack; and
restoring the backup of the distributed environment, wherein restoring the backup of the distributed environment includes modifying a number of nodes in the current distributed environment based on the identified difference between the first number of nodes and the number of nodes in the second stack.

* * * * *